United States Patent Office 2,863,858
Patented Dec. 9, 1958

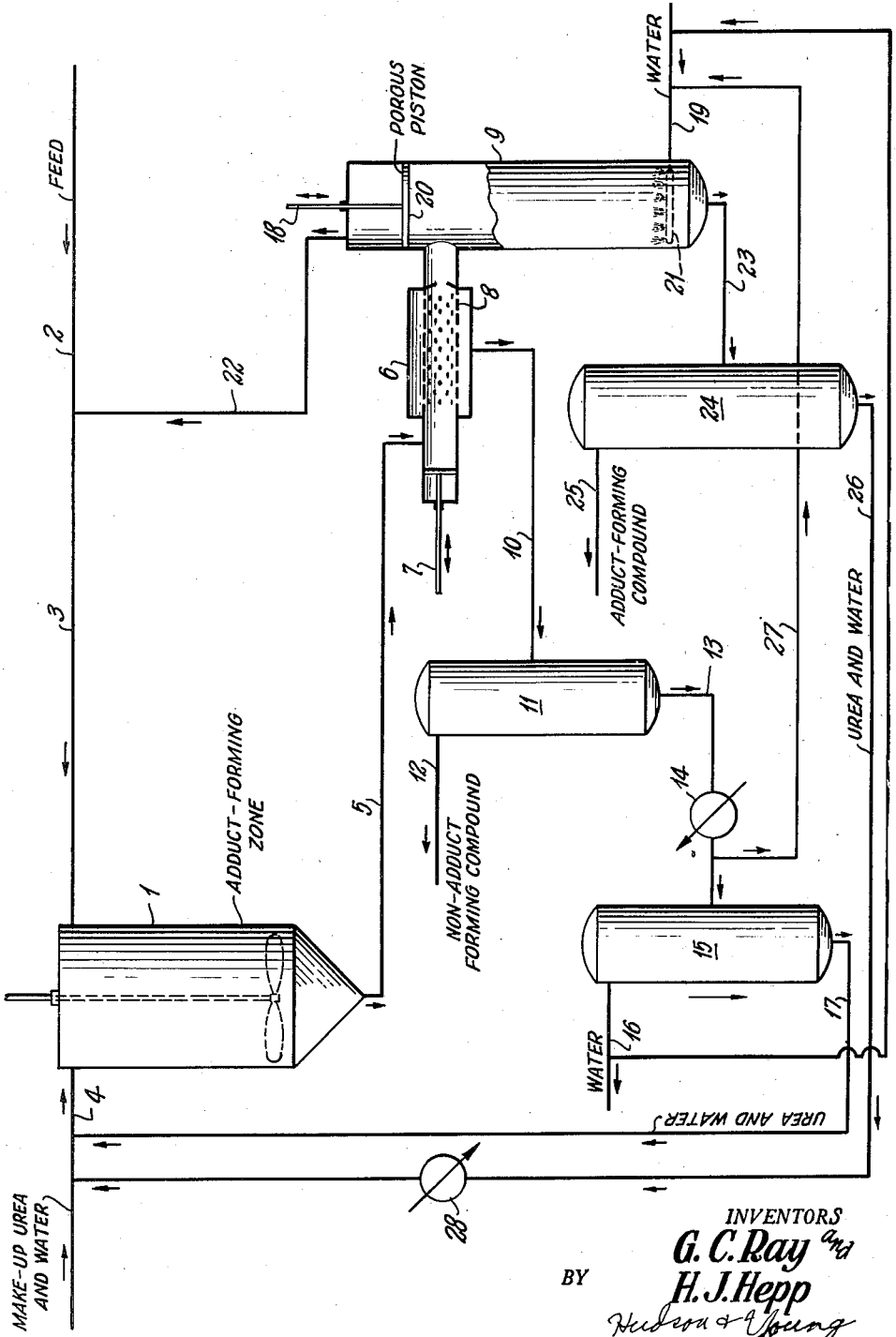

2,863,858

SEPARATING ORGANIC COMPOUNDS

Gardner C. Ray and Harold J. Hepp, Bartlesville, Okla., assignors to Phillips Petroleum Company, a corporation of Delaware Application July 6, 1954, Serial No. 441,202

3 Claims. (Cl. 260—96.5)

This invention relates to the separation of organic compounds. In one of its aspects this invention relates to separation of organic compounds which form solid adducts with urea or thiourea from mixtures thereof with organic compounds which do not form such adducts.

The use of urea and thiourea adducts for the separation of organic compounds has found particular use in the separation of hydrocarbon mixtures. Urea selectively reacts with straight chain hydrocarbons to the exclusion of other types while thiourea forms complexes with cyclic and isoparaffin hydrocarbons in preference to aromatic and straight chain molecules. For example, the process of this invention can be used to separate isooctane from normal heptane and normal octane from 2,2,4-trimethylhexane.

The organic mixtures to which the present invention applies may be natural occurring mixtures, or those obtained by processing naturally occurring products or any combination thereof. For example, the process is especially applicable to naturally occurring petroleum fractions, but also may be utilized in the purification of product streams made as the result of a variety of petroleum refining operations. The process of the present invention is applicable for example for the dewaxing of lube oils and jet fuels, octane number improvement of naphthas and "natural" gasoline or cracked gasolines, cetane number improvement of distillate fuels, preparation of specialty products as certain pure hydrocarbons, and the like. It is known that urea forms crystalline molecular complexes (adducts) with straight-chain hydrocarbons having at least four carbon atoms, the ease of formations increases with increasing molecular weight of the hydrocarbon. In general, urea forms adducts with straight-chain hydrocarbons of from 6 to 50 carbon atoms at temperatures not below room temperature. While urea forms adducts with straight-chain organic compounds thiourea forms adducts with branched-chain and naphthenic organic compounds.

As already indicated hereinabove, the organic compounds which form adducts with urea comprise compounds having substantially straight-chain structure. The straight-chain compounds may be of a number of types, such as hydrocarbons, alcohols, ketones, aldehydes, esters, amines, amides, sulfides, disulfides, mercaptans, organic acids, halogenated compounds, ethers, etc., these compounds will generally contain 4 to 50 carbon atoms in the chain, and more generally from 6 to 50 carbon atoms since the lower molecular weight compounds form weak adducts and do not readily tie up all of the compound as adduct.

Typical hydrocarbons which forms crystalline complex with urea include the straight-chain paraffin hydrocarbons such as hexane, heptane, octane, nonane, decane, undecane, dodecane, tridecane, tetradecane, pentadecane, etc., up to and including $C_{50}H_{102}$. Corresponding olefins, diolefins, polyolefins, acetylenes, olefin-acetylene, etc., also form crystalline complexes with urea.

Normal alcohols, especially those having four or more carbon atoms also form complexes with urea. These include the normal aliphatic monohydric alcohols such as butyl alcohol, amyl alcohol, hexyl alcohol, heptyl alcohol, octyl alcohol, nonyl alcohol, carnaubyl alcohol, etc. and the polyhydric alcohols such as ethylene glycol, diethylene glycol, propylene glycol, hexitol, etc. Corresponding aldehydes, ketones, esters, acids, amines, amides, nitroparaffins, and their thio-analogs may also be treated according to the invention.

On the other hand, organic compounds which form complexes with thiourea are those having a predominating member which is substantially branched radical or naphthene radical such as alkaryl hydrocarbons wherein at least one alkyl group is an isoparaffin radical. In addition to the branched-chain hydrocarbons and naphthenes, aromatics with long chain branches will form solid adducts with thiourea. Derivatives of these compounds also form thiourea adducts.

In order to show the broad scope of the applicability of the invention, the following substances are listed as being representative of the compounds forming solid complexes with thiourea: isobutane, 2,2-dimethylpropane, 2-methylpentane, 2,2,4-trimethylhexane, 5-methylnonane, 2,6,10,14,18,22 - hexamethyltetracocane, 2,6,12,16-tetramethyl - 9 - (2,6-dimethyloctyl)heptadecane, chloroform, methylchloroform, bromoform, tetrachloroethylene, ethylidenechloride, trimethylene bromide, carbon tetrachloride, ethylene dibromide, sec-butyl bromide, n-propyl iodide, ethylene chlorohydrin, isopropyl iodide, chlorocyclohexane, bromocyclohexane, bornyl chloride, cyclohexanol, cyclohexanone, borneol, cyclohexylamine, paramethylcyclohexanol, 1,3-cyclohexanone, 1-menthone, piperitone, fenchone, thujone, camphor, methylisopropyl ketone, mesilyl oxide, diisopropyl ketone, diethyl ketone, nitrobenzene, chlorobenzene, dicyclopentadiene, ethyl oxalate, cis-1,2-dimethylcyclopentane, methylcyclohexane, trans-1,2-dimethylcyclohexane, trans-1,3-dimethylcyclohexane, cis-1,4-dimethylcyclohexane, 2,2,4-trimethylcyclohexane, trans-1-methyl-3-cyclopentane, 1,1,3 - trimethylcyclopentane, cis, trans, cis-1,2,3-trimethylcyclopentane, cis, cis, trans-1,2,4-trimethylcyclopentane, and cis, trans, cis-1,2,4-trimethylcyclopentane. In general thiourea forms adducts with branched-chain organic compounds such as branched-chain alkane or alkene hydrocarbons having from 5 to 50 carbon atoms or more in the straight-chain portion of the molecule and from 1 to 20 carbon atoms in one or more side chains.

The hereinabove mentioned compounds which form adducts with urea or thiourea are illustrative of typical adduct forming compounds. The list is not intended to be exhaustive and many other compounds which will form adducts with urea or thiourea can be found in the art. It has also been found that an activator-solvent such as methanol, water, or the like will aid in adduct formation. The urea or thiourea in the activator or solvent should be at least 95 percent of saturation, the usual procedure being introducing the amide in a saturated solution along with an excess of solid amide.

During the formation of the adduct of the amide with the organic compound, the non-adduct forming compounds tend to become occluded by the adduct crystals. If the adduct forming compound is to be recovered in substantially pure form, it is necessary to separate this occluded material from the adduct.

It is an object of this invention to provide a novel method of separating organic compounds.

It is another object of this invention to provide a novel process for the separation of straight-chain hydrocarbons from an admixture of hydrocarbons comprised of straight-chain, branched-chain and cyclic hydrocarbons.

Still another object of this invention is to provide a process for separating an adduct-forming organic compound from admixture with a non-adduct-forming compound by the selective formation of an adduct with urea or thiourea.

Another object of this invention is to provide a novel method for regenerating urea adducts.

Still other objects, advantages and features of this invention will become apparent to one skilled in the art upon reading this disclosure and claims in conjunction with the attached drawing.

In accordance with the invention, a solid crystalline adduct is formed in an adduct-forming zone by reacting an amide selected from the group consisting of urea and thiourea with an adduct-forming compound in admixture with non-adduct-forming compounds and after the non-adduct-forming compounds are filtered from the adduct, the adduct is decomposed with water or water containing amide, a portion of the released adduct-forming compound is used for washing the adduct substantially free of impurities. The decomposition and washing of adduct crystals is preferably carried out in a porous piston type column.

This mode of operation offers several advantages which include handling the amide as a solution or slurry rather than solid or molten and washing the adduct with pure adduct-forming compound to increase the purity of the product without resort to externally supplied materials as wash liquids for the adduct.

This invention will be further described by reference to the accompanying drawing which is a flow diagram illustrating a preferred embodiment of the process of this invention. Valves, pumps, etc., are not shown it being within the skill of the art to supply these as needed.

Referring to the drawing a feed comprising adduct-forming and non-adduct-forming compounds in admixture is fed to adduct-forming zone 1 via conduits 2 and 3. Urea or thiourea in a saturated water solution and excess amide as a slurry enters the adduct-forming zone via conduit 4. The amide and organic compound are mixed and pass downward through zone 1 wherein the amide and the adduct-forming compounds react to form a solid crystalline adduct leaving the non-adduct forming-compound in the liquid phase. This adduct-forming zone will generally be operated at atmospheric pressure and in a temperature range between 0 and 120° F. or more preferably at room temperature. However, it is within the scope of this invention to operate at higher pressures say 10 to 500 pounds per square inch where the organic materials would be vaporous at lower pressures. In general, an activator solvent will also be present in the solution. These activators are known in the art. Those activators most frequently used are methanol, ethanol, acetone, acetaldehyde, ethylene glycol and the like.

The adduct and liquid passes via conduit 5 to filtering zone 6. As piston 7 or screw conveyor carries the material through zone 6, the major portion of liquid or non-adducted materials as well as aqueous amide solution is withdrawn through filter screen 8 and conduit 10 to separating zone 11.

Since this invention will generally be applied to non-water soluble compounds such as hydrocarbons and the solvent is water, the separation zone 11 will ordinarily be a simple phase separator. However, fractional distillation can be used. In any case, the non-adduct-forming compound will be removed via conduit 12 to storage not shown, and the amide and activator-solvent will pass via conduit 13, heater 14, conduits 27 and 19 to purification zone 9 where this solution is used to decompose adduct as will be explained. It is within the scope of this invention to provide a means, such as fractional distillation column, to separate the activator solvent, if any, from the non-adduct forming-compound removed via conduit 12 and to recycle the recovered activator solvent to zone 1.

The adduct and undissolved amide along with occluded material passes from filtrating zone 6 to vessel 9 as a solid material forming a contiguous mass in this vessel. This vessel 9 is fitted at its upper end, preferably, with a reciprocating porous piston 20. This piston is powered by a reciprocating power supply, not shown, through connection 18. As the porous piston pushes downward it pushes the contiguous mass of adduct downward and gently compresses the adduct in vessel 9, and liquid (released hydrocarbon) passes upward through the porous piston as it descends. After reaching the end of the downward stroke, the piston is returned to the upper end of the vessel 9. This piston is so designed that the porous plates are in the horizontal position on the down stroke and are hinged to drop down on the up stroke allowing solid adduct passing into the vessel during the stroke to fall past the piston. Such a piston is fully disclosed in copending application of John G. Weedman, filed October 23, 1950, having Serial No. 191,676, now Patent 2,731,456, dated January 17, 1956. However, the plates can be stationary and the auger or piston 7 will be so connected with piston 18 that solid adduct is fed to vessel 9 only when the piston is up. As the piston 20 compresses the solid adduct, the amide solution from zone 11 is introduced to the bottom of the column via spider or perforated ring 21. This amide solution which has been heated is no longer saturated and is at sufficient temperature that the adduct is decomposed. The amide solution causes the adduct to break down and some of the released adduct-forming material rises through the solids in the vessel 9 washing impurities from the adduct. The amide solution is of greater density than the adduct-forming compound thus causing some of the adduct-forming compound to rise in the vessel 9 so as to wash the adduct. As the piston gently presses the contiguous mass of crystals, adduct-forming compound containing occluded material is squeezed through the mass. The impurities along with the released material continue to rise and are removed from vessel 9 and returned to adduct-forming zone 1 via conduits 22 and 3.

As was said, we prefer to use a porous piston which is permeable to the rising liquid but is impermeable to the solid adduct and the amide. On the other hand, a solid piston can be employed, in which case conduit 22 will leave vessel 9 at a position below the lower level reached by piston 20. The outlet to conduit 22 would also be covered by a screen to prevent solid adduct or amide from being carried along with the impurities.

The temperature and rate of flow of the water will be controlled so as to decompose the adduct only part way up the column. That is a temperature gradient will be maintained from top to bottom of the column. It is within the scope of this invention to employ a means of cooling the upper portion of this column if it is desired. However, by carefully controlling the feed rate and discharge rate and the temperature of the water, such cooling is not required.

The larger portion of released adduct-forming compound along with the amide and water will be withdrawn through conduit 23 and passed to phase separation zone 24. The outlet from vessel 9 to conduit 23 can be covered with a screen to prevent solids from passing therethrough. Conduit 23 can be so designed that the flow therethrough will be at the desired rate. However, it is within the scope of this invention to regulate the flow through this conduit responsive to changes in liquid level in the decomposition zone 9. Or other flow regulation devices can be used. It is within the skill of the art to supply suitable liquid level flow control regulators. In any case, only liquid passes through conduit 23 thus insuring the contiguous mass of solids being pressed by the descending piston.

Separation zone 24 is a simple phase separation zone, the adduct-forming compound being taken off via conduit 25 to storage not shown. If an activator solvent is used in zone 1, some of this material will be present in the adduct-forming compound at this point. It is therefore within the scope of this invention to remove this material if so desired and to recycle the recovered activator solvent to zone 1. The urea-water solution is returned to adduct-forming zone 1 via conduits 26 and 4. It is, of course, within the scope of this invention to provide a cooler, such as 28, in either of these conduits in order to have the solvent-urea solution at the desired adduct-forming temperature in zone 1.

The embodiment described uses hot amide solution as the decomposing medium. In this embodiment only make-up water to compensate for mechanical losses needs to be added.

In another embodiment of this invention, amide solution from zone 11 passes through conduit 13 and heater 14 to fractionation zone 15 wherein a portion of the water is separated by flashing via conduit 16 from the solution thereby concentrating the amide. Crystalline amide can be formed in this zone depending upon the temperature and amount of water removed. The amide and solution passes via conduits 17 and 4 to the adduct-forming zone. The water removed from zone 15 via conduit 16 is returned to the system as decomposition medium via conduit 19 and spider 21. The rate of addition of water, correlated with its temperature, will be controlled so as to decompose the adduct only part way up the column. The temperature and addition rate of water will be governed principally by the amount of urea adduct and urea to be decomposed and by the nature of the material "adducted" with the urea.

In still another embodiment, fresh water can be added to decompose the adduct via conduit 19 and spider 21. In this case, water at its available temperature will generally be employed. The amide is decomposed due to the excess water. In this embodiment, a fractionation zone, similar to zone 15 will be installed in conduit 26 to remove excess water. This, of course, is only necessary when more water is added via conduit 19 than is removed via conduit 16. A further modification of this embodiment would be to recycle water from the fractionation zone in conduit 26 to the decomposition and wash zone 9.

We have described our invention in terms of one of its preferred embodiments. Some modifications have been suggested in the above description. Those skilled in the art will see many other modifications which can be made without departing from the scope of this invention.

We claim:

1. A process for separating organic compounds comprising adduct-forming compounds in admixture with non-adduct-forming compounds said process comprising contacting in an adduct-forming zone the said admixture with an aqueous solution of an amide selected from the group consisting of urea and thiourea under adduct-forming conditions to produce an adduct of the adduct-forming compound and a portion of the amide, said amide solution being of greater density than said adduct forming compound passing the resulting mixture to a filtration zone wherein the water containing non-adducted amide and the non-adduct-forming compound are filtered off leaving the adduct, passing the adduct to the upper end of a decomposition column wherein a contiguous mass of adduct is formed, passing the water containing amide and non-adduct-forming compound to a separation zone, withdrawing the non-adduct-forming compound from said separation zone, heating the water containing amide and passing the hot solution to a flash zone wherein a portion of the water is flashed free of amide, passing the remaining water and amide to the adduct-forming zone, condensing the flashed water and passing it at a temperature sufficiently high to decompose adduct to the lower end of said decomposition column thereby decomposing adduct entering the lower level of said column and releasing the adduct-forming compound and the amide, maintaining a temperature gradient in said column so as to decompose adduct only in the lower level of said column, successively applying a compression and filtering means to the top of said contiguous mass thereby gently compressing said mass, allowing a portion of said released adduct-forming compound to pass upward through said compression and filtering means thereby washing said contiguous mass of adduct free of occluded impurities, withdrawing the wash liquid and occluded material from upper level of said column, passing said withdrawn liquid to the adduct-forming zone, withdrawing the remaining liquid material from the lower level of said column, passing last said withdrawn liquid to a separation zone, withdrawing adduct-forming compound from last said separation zone, and withdrawing remaining liquid from last said separation zone and passing it to the adduct-forming zone.

2. The process of claim 1 wherein the last said separation is simple phase separation.

3. The process of claim 2 wherein the organic compounds are hydrocarbons.

References Cited in the file of this patent

UNITED STATES PATENTS

| | | |
|---|---|---|
| 2,627,513 | Arey | Feb. 3, 1953 |
| 2,672,457 | Weedman | Mar. 16, 1954 |
| 2,676,167 | Findlay et al. | Apr. 20, 1954 |
| 2,731,456 | Weedman | Jan. 17, 1956 |